(12) United States Patent
Yamamoto et al.

(10) Patent No.: US 7,984,239 B2
(45) Date of Patent: Jul. 19, 2011

(54) CONTROL PROGRAM DOWNLOAD DEVICE

(75) Inventors: Hitoshi Yamamoto, Hyogo (JP); Mitsushige Baba, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 741 days.

(21) Appl. No.: 11/326,429

(22) Filed: Jan. 6, 2006

(65) Prior Publication Data

US 2006/0156302 A1      Jul. 13, 2006

(30) Foreign Application Priority Data

Jan. 7, 2005   (JP) .................................. 2005-002152

(51) Int. Cl.
*G06F 13/00* (2006.01)
(52) U.S. Cl. ......... 711/115; 711/103; 711/154; 717/178
(58) Field of Classification Search .................... 711/115
See application file for complete search history.

(56) References Cited

U.S. PATENT DOCUMENTS

| | | | |
|---|---|---|---|
| 6,249,825 B1 * | 6/2001 | Sartore et al. ..................... 710/8 |
| 6,389,029 B1 * | 5/2002 | McAlear ........................ 370/402 |
| 6,823,526 B2 * | 11/2004 | Howard et al. ................. 719/327 |
| 2002/0133654 A1 | 9/2002 | Yamamoto |
| 2004/0133712 A1 | 7/2004 | Yamamoto et al. |
| 2005/0066102 A1 | 3/2005 | Yamamoto et al. |
| 2005/0077355 A1 | 4/2005 | Yamamoto et al. |
| 2005/0102439 A1 | 5/2005 | Kondo |

FOREIGN PATENT DOCUMENTS

| | | |
|---|---|---|
| JP | 08-190963 | 7/1996 |
| JP | 10224685 | * 8/1998 |
| JP | 2000-207153 | 7/2000 |
| JP | 2002-510416 | 4/2002 |
| JP | 2002-297389 | 10/2002 |
| JP | 2003-084978 | 3/2003 |
| JP | 2003-263323 | 9/2003 |
| JP | 2004-070621 | 3/2004 |
| WO | WO 99/01820 | 1/1999 |

OTHER PUBLICATIONS

Kitajima, T., Derwent Reference No. 1998-513357, Digital still camera with control . . . program is updated.*

* cited by examiner

*Primary Examiner* — Hetul Patel
(74) *Attorney, Agent, or Firm* — Dickstein Shapiro LLP

(57) ABSTRACT

A control program download device is disclosed that is to be connected to a host computer and to one or more external devices having predetermined functions so as to download a control program for controlling the external device from the host computer to a rewritable internal memory circuit. The control program download device comprises an external setting unit in which external information indicating the connection to the external device is preset, an external memory unit into which the external information is loaded from the external setting unit in response to a control signal input to the external memory unit, and a download control unit that controls download of the control program to the internal memory circuit.

10 Claims, 7 Drawing Sheets

CONTROL PROGRAM DOWNLOAD DEVICE

BACKGROUND OF THE INVENTION

1. Field of the Invention

The present invention relates to a control program download device to be connected to one or more external devices to download a control program from a host computer to an internal memory circuit.

2. Description of the Related Art

Referring to FIG. 7, a related-art USB (universal serial bus) control device 100, to be connected to a host computer HC, comprises therein a USB control unit 111, one or more external devices (first and second external devices 102 and 103 in the example shown in FIG. 7), first and second control units 112 and 113 for controlling the corresponding first and second external devices 102 and 103, a CPU 114, a work RAM 115, and a ROM control unit 116 and a ROM 105 that form firmware for controlling the CPU 114. The CPU 114 controls the above described control units using the firmware and the work RAM 115. Generally, as shown in FIG. 7, the CPU 114 is provided inside a control LSI 104, and the firmware for controlling the CPU 114 includes a flash ROM, such as the ROM 105, connected to the control LSI 104. In some cases, the ROM 105 is embedded in the control LSI 104.

Using external mask ROM and external flash ROM by connecting to the control LSI 104 leads to problems such as increased cost and increased size of the USB control device 100. If an unrewritable ROM, such as a mask ROM, is provided inside the control LSI 104, although the cost and size of the USB control device 100 are reduced, the control operations of the control LSI 104 are fixed. Therefore, the first and second external devices 102 and 103 used with the USB control device 100 cannot be changed. That is, the USB control device 100 cannot be used with various external devices. If a flash ROM is provided inside the control LSI 104, the firmware can be rewritten, thereby allowing the USB control device 100 to be used with various external devices. However, providing the flash ROM inside the control LSI results in an increase in manufacturing cost of the control LSI 104.

Thus, there has been a demand for a method for downloading firmware to the control LSI 104 without increasing the cost and size of the USB control device 100. According to a method for downloading firmware disclosed in, for example, Patent Document 1, a USB control device first connects to a host computer by performing a USB configuration process only for downloading firmware, and downloads the firmware from the host computer to an available memory in the USB control device. After the download, the USB configuration is electronically reset to execute the new firmware. That is, by performing another USB configuration process corresponding to the downloaded firmware, a control LSI can be used with various external devices.

There is another method for surely downloading firmware by using two or more communications tools (see, for example, Patent Document 2).

[Patent Document 1] International Publication No. WO 99/01820 (Published Japanese Translation No. 2002-510416)

[Patent Document 2] Japanese Patent Laid-Open Publication No. 2003-263323

However, the above described methods take time to recognize an external device because the USB connection is reconfigured after downloading the firmware.

SUMMARY OF THE INVENTION

The present invention may solve at least one problem described above.

According to an aspect of the present invention, there is provided a control program download device having high versatility, capable of downloading firmware without reconnecting to a USB or the like.

According to another aspect of the present invention, there is provided a control program download device to be connected to a host computer and one or more external devices having predetermined functions so as to download a control program for controlling the external device from the connected host computer to a rewritable internal memory circuit, the control program download device comprising an external setting unit in which external information indicating the connection to the external device is preset, an external memory unit into which the external information is loaded from the external setting unit in response to a control signal input to the external memory unit, and a download control unit that controls download of the control program to the internal memory circuit. Upon the download of the control program, the download control unit loads the external information from the external setting unit into the external memory unit, reads the external information from the external memory unit to send the read external information to the host computer in response to a request for configuration information from the host computer, and downloads the control program corresponding to the external device from the host computer to the internal memory unit.

The above-described control program download device can download the control program, such as firmware, from the host computer to the internal memory circuit, thereby eliminating the need for an external nonvolatile memory. Having no external nonvolatile memory reduces the system cost and space. If a control program, such as firmware, is loaded in an internal mask ROM for the purpose of cost reduction and space reduction, it is difficult to alter the firmware. On the other hand, in the above-described control program download device, the firmware is downloaded to the rewritable internal memory circuit such that the firmware can be easily altered. Therefore, the versatility of the control program download device is increased.

DETAILED DESCRIPTION OF THE PREFERRED EMBODIMENT

The following description provides an exemplary embodiment of the present invention with reference to the accompanying drawings.

First Embodiment

Figure 1:
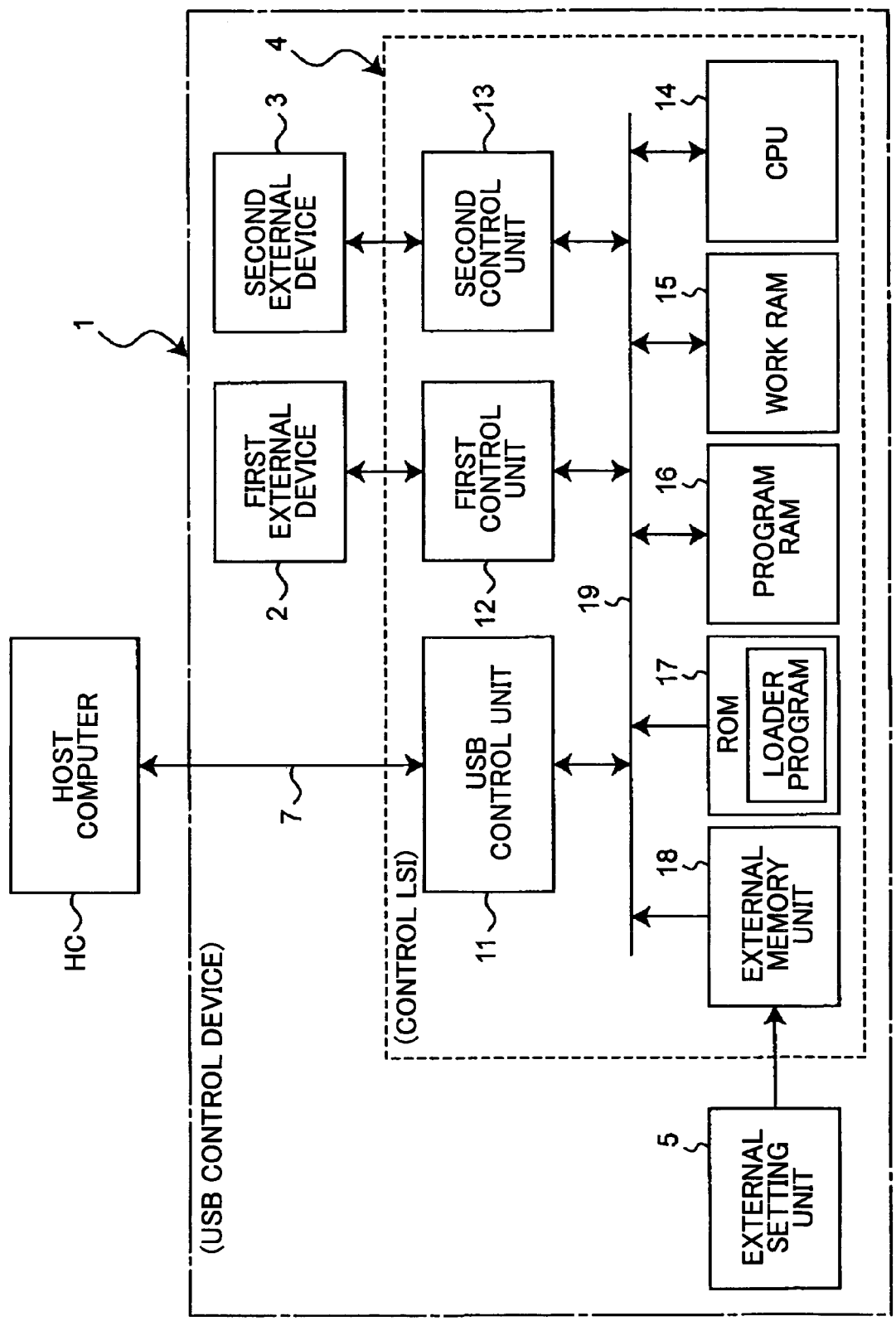
FIG. 1 is a block diagram illustrating a configuration of a control program download device according to a first embodiment of the present invention.

FIG. 1 is a block diagram illustrating a configuration of a USB control device 1 as an example of a control program download device according to a first embodiment of the present invention.

FIG. 1 shows the USB control device 1, a host computer HC, and one or more external devices (first and second external devices 2 and 3 in the example shown in FIG. 1).

The USB control device 1 comprises the first and second external devices 2 and 3 each having predetermined functions, a control LSI 4 for connecting the host computer HC to the first and second external devices 2 and 3 via a USB 7, and an external setting unit 5 in which information about conditions of the present first and second external devices 2 and 3 are preset.

The control LSI 4 is connected to the host computer HC via the USB 7, and comprises a USB control unit 11 as an interface to the host computer HC, a first control unit 12 connected to the first external device 2 to control the first external device 2, a second control unit 13 connected to the second external device 3 to control the second external device 3, a CPU 14 for controlling the components of the control LSI 4, and a work RAM 15 that holds intermediate data and the like created when the CPU 14 executes a program. The control LSI 4 further comprises a program RAM 16 that holds firmware for operating the CPU 14, and a ROM 17 that stores a program for loading the firmware into the program RAM 16 when the host computer HC is connected via the USB 7 and a loader program for operating the USB control unit 11 until main firmware is loaded to the program RAM 16.

The control LSI 4 further comprises an external memory unit 18 that reads out information about the conditions of the present first and second external devices 2 and 3 from the external setting unit 5. The USB control unit 11, the first control unit 12, the second control unit 13, the CPU 14, the work RAM 15, the program RAM 16, the ROM 17, and the external memory unit 18 are all connected to a CPU bus 19. The USB control unit 11, the CPU 14, the work RAM 15, and the ROM 17 form a download control unit, and the program RAM 16 forms an internal memory circuit. Further, each of the first control unit 12 and the second control unit 13 forms an external device control unit.

Figure 2:
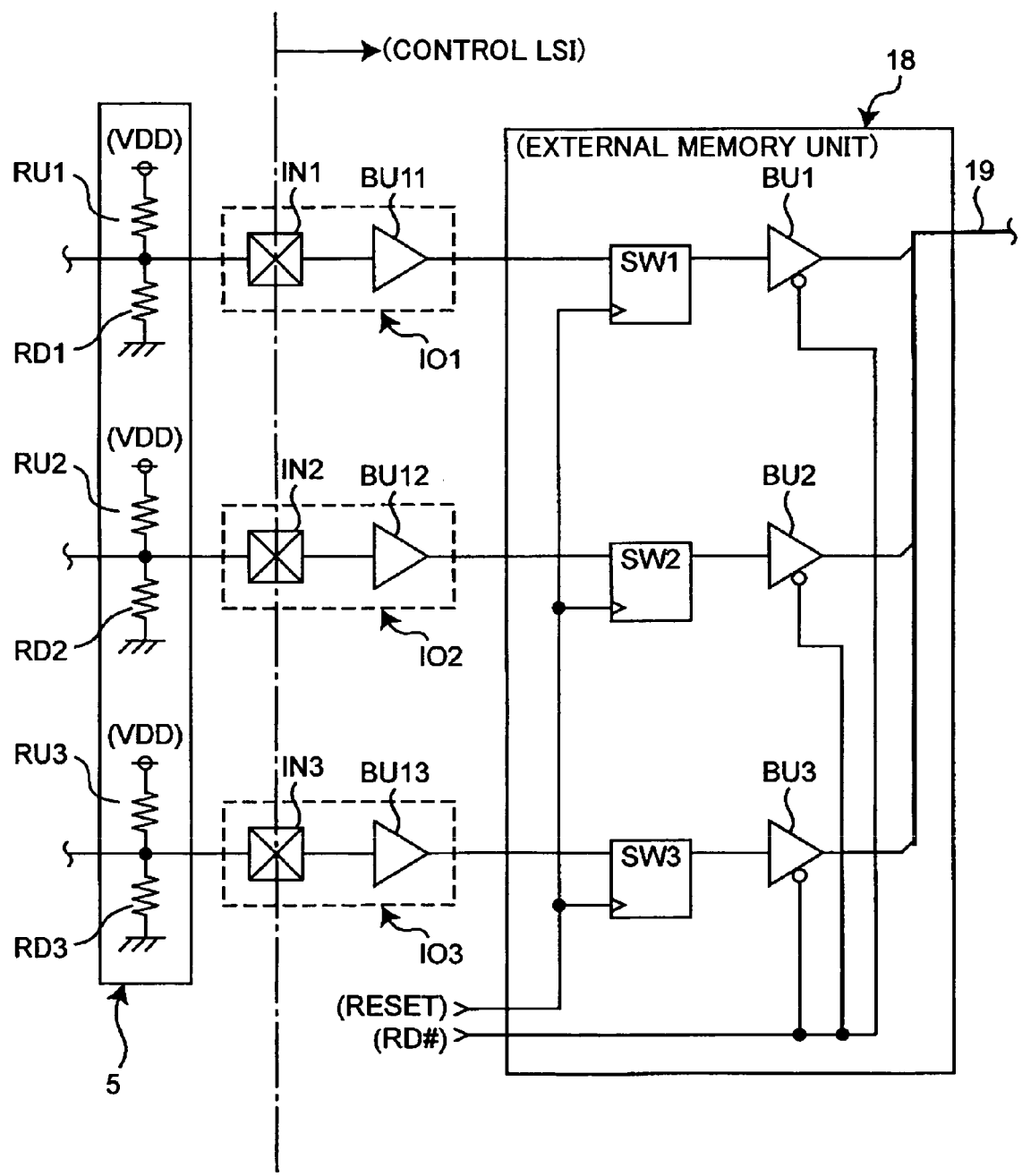
FIG. 2 is a circuit diagram illustrating an example of internal configurations of an external setting unit and an external memory unit of FIG. 1.

FIG. 2 is a circuit diagram illustrating an example of internal configurations of the external setting unit 5 and the external memory unit 18.

Referring to FIG. 2, the external setting unit 5 is connected to the external memory unit 18 through I/O cells IO1 through IO3. The external setting unit 5 comprises pull-up resistors RU1 through RU3 and pull-down resistors RD1 through RD3, while the external memory unit 18 comprises flip-flops SW1 through SW3 and 3-state buffers BU1 through BU3. The I/O cell IO1 comprises an input terminal IN1 of the control LSI 4 and a buffer BU11. The I/O cell IO2 comprises an input terminal IN2 of the control LSI 4 and a buffer BU12. The I/O cell IO3 comprises an input terminal IN3 of the control LSI 4 and a buffer BU13.

The pull-up resistors RU1 through RU3 are adapted to raise the corresponding input terminals IN1 through IN3 to power supply voltages, while the pull-down resistors RD1 through RD3 are adapted to pull down the corresponding input terminals IN1 through IN3 to ground voltage. Each of the input terminals IN1 through IN3 is connected to the corresponding one of the pull-up resistors RU1 through RU3 or the corresponding one of the pull-down resistors RD1 through RD3. The information about the conditions of the present first and second external devices is set according to whether the corresponding input terminals IN1 through IN3 are pulled up or down. Binary levels of the input terminals IN1 through IN3 are input to data input ends of the corresponding flip-flops SW1 through SW3 via the corresponding buffers BU11 through BU13. System signals RESET are input to clock signal input ends of the flip-flops SW1 through SW3.

Output ends of the flip-flops SW1 through SW3 are connected to the CPU bus 19 via the corresponding 3-state buffers BU1 through BU3. Read control signals RD# from the CPU 14 are input to control electrodes of the 3-state buffers BU1 through BU3. When the CPU 14 reads out the information held in the flip-flops SW1 through SW3, the CPU 14 asserts the read control signals RD# so as to cause the 3-state buffers BU1 through BU3 to output information held in the corresponding flip-flops SW1 through SW3. On the other hand, when the CPU 14 does not read out the information held in the flip-flops SW1 through SW3, the CPU 14 negates the read control signals RD# and puts output ends of the 3-state buffers BU1 through BU3 in high impedance states.

Signal levels input to the input terminals IN1 through IN3 are stored in the corresponding flip-flops SW1 through SW3 when a reset of a system is canceled. The information stored in the flip-flops SW1 through SW3 is read out by the CPU 14 via the CPU bus 19. For example, suppose that the information stored in the flip-flop SW1 is a bit that indicates whether the second external device 3 is present. If the second external device 3 is present, the pull-up resistor RU1 is connected to the input terminal IN1 while the pull-down resistor RD1 is disconnected from the input terminal IN1, thereby changing the level of the output end of the flip-flop SW1 to high. Thus, the CPU 14 recognizes that the second external device 3 is present. If, on the other hand, the second external device 3 is not present, the pull-down resistor RD1 is connected to the input terminal IN1 while the pull-up resistor RU1 is disconnected from the input terminal IN1, thereby changing the level of the output end of the flip-flop SW1 to low. Thus, the CPU 14 recognizes that the second external device 3 is not present.

It is to be noted that the flip-flops SW1 though SW3 only hold data output from the corresponding I/O cells IO1 through IO3 at the time of canceling the reset, and the I/O cells IO1 through IO3 can be used as regular I/O cells after canceling the reset. The input terminals IN1 through IN3 used in this embodiment can be pulled up and pulled down during normal use. It should be understood that if there is no problem with increasing the number of external ports, the USB control device 1 that does not use the flip-flops SW1 through SW3 can achieve effects the same as the system shown in FIG. 2 by reading directly the output signal levels of the I/O cells IO1 through IO3 via the CPU bus 19.

Figure 3:
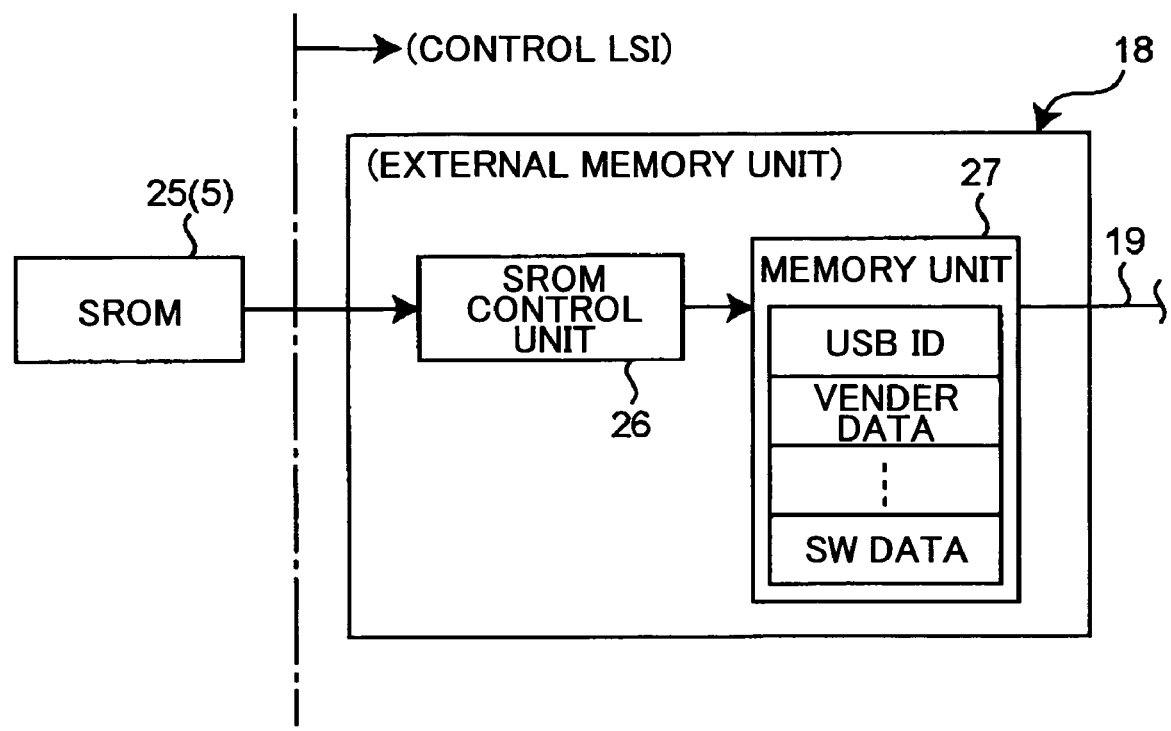
FIG. 3 is a block diagram illustrating another example of the internal configurations of the external setting unit and the external memory unit of FIG. 1.

FIG. 3 is a block diagram illustrating another example of the internal configurations of the external setting unit 5 and the external memory unit 18 of FIG. 1, wherein a serial ROM (hereinafter referred to as SROM) 25 is used as the external setting unit 5.

Referring to FIG. 3, the external memory unit 18 comprises a SROM control unit 26 and a memory unit 27 including a RAM. The SROM control unit 26 reads out data from the SROM 25, in which necessary data are written in advance, according to an instruction from the CPU 14, and loads the read data into the memory unit 27. The memory unit 27 is connected to the CPU bus 19 such that the CPU 14 reads out the data held in the memory unit 27 via the CPU bus 19.

A typical USB control device can configure a USB with use of a unique user ID. The unique user ID is generally stored in an inexpensive small SROM connected to the control LSI 4. Data are read out before starting a USB configuration process such that the user ID is used when the USB configuring process is performed. Information such as that stored in the flip-flops SW1 through SW3 of FIG. 2 is stored as "SW Data" in the SROM 25 together with other data items. The CPU 14 can recognize the external states by managing this information.

Figure 4:
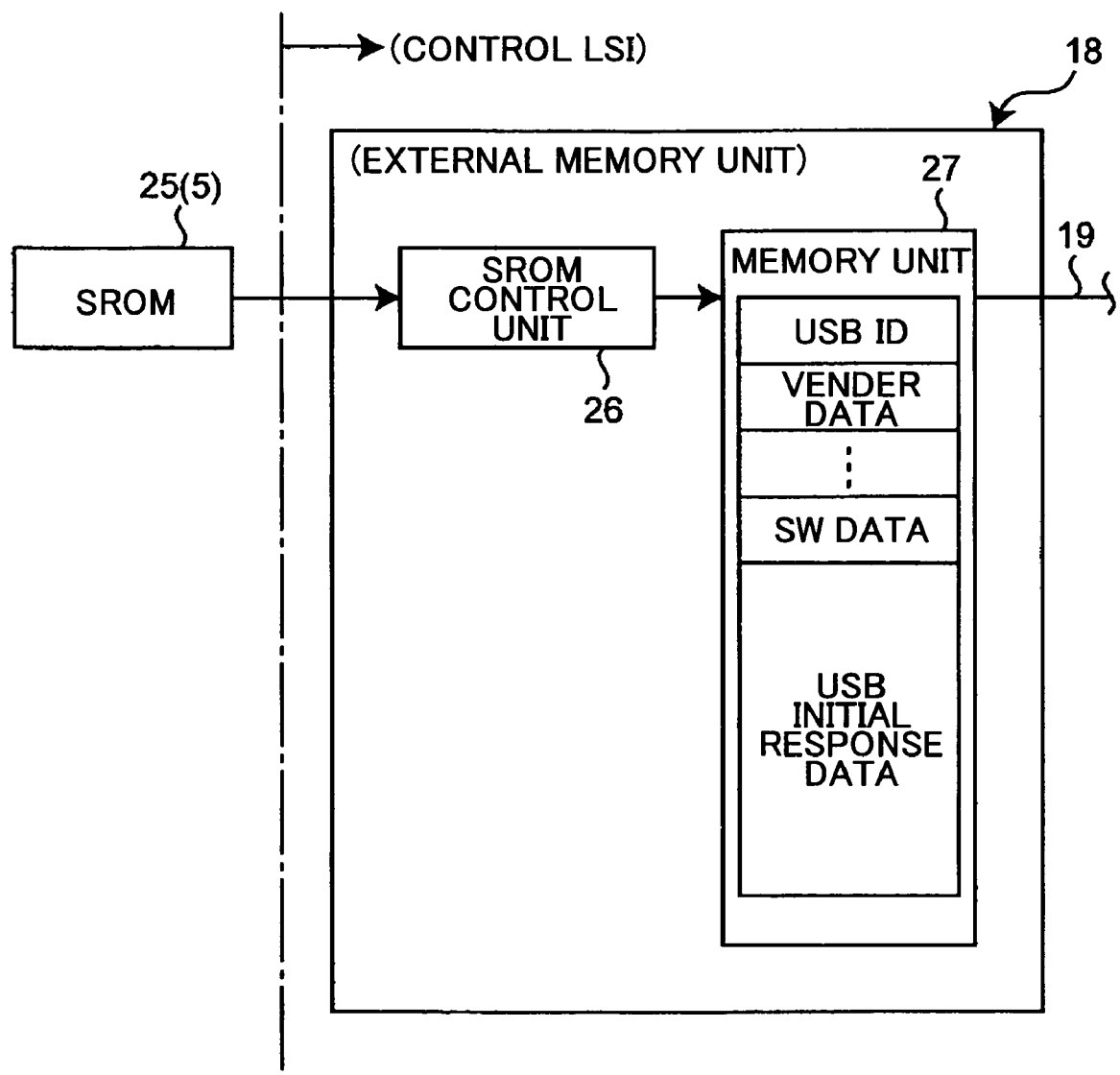
FIG. 4 is a block diagram illustrating further another example of the internal configuration of the external memory unit of FIG. 1.

The loader program of FIG. 1 changes a data item for a USB initial response based on the "SW Data" of FIG. 3, which represent information similar to the data held in the flip-flops SW1 through SW3 of FIG. 2, and transmits the changed data item to the host computer HC. With this configuration, however, the USB initial response is limited to combinations of USB initial response data items stored in loader program. To overcome this disadvantage, USB initial response information is stored in advance in the SROM 25, including composite device information showing the presence of a composite device, first external device information indicating that the first external device 2 is connected, second external device information indicating that the second external device 3 is connected, and loader device information indicating that a loader function for downloading the firmware is provided in the program RAM 16. This information is read out from the SRCM 25 and stored as USB initial response data in the memory unit 27 of the external memory unit 18 as shown in FIG. 4. The USB initial response can be produced more flexibly by using the USB initial response data stored in the memory unit 27.

Figure 5:
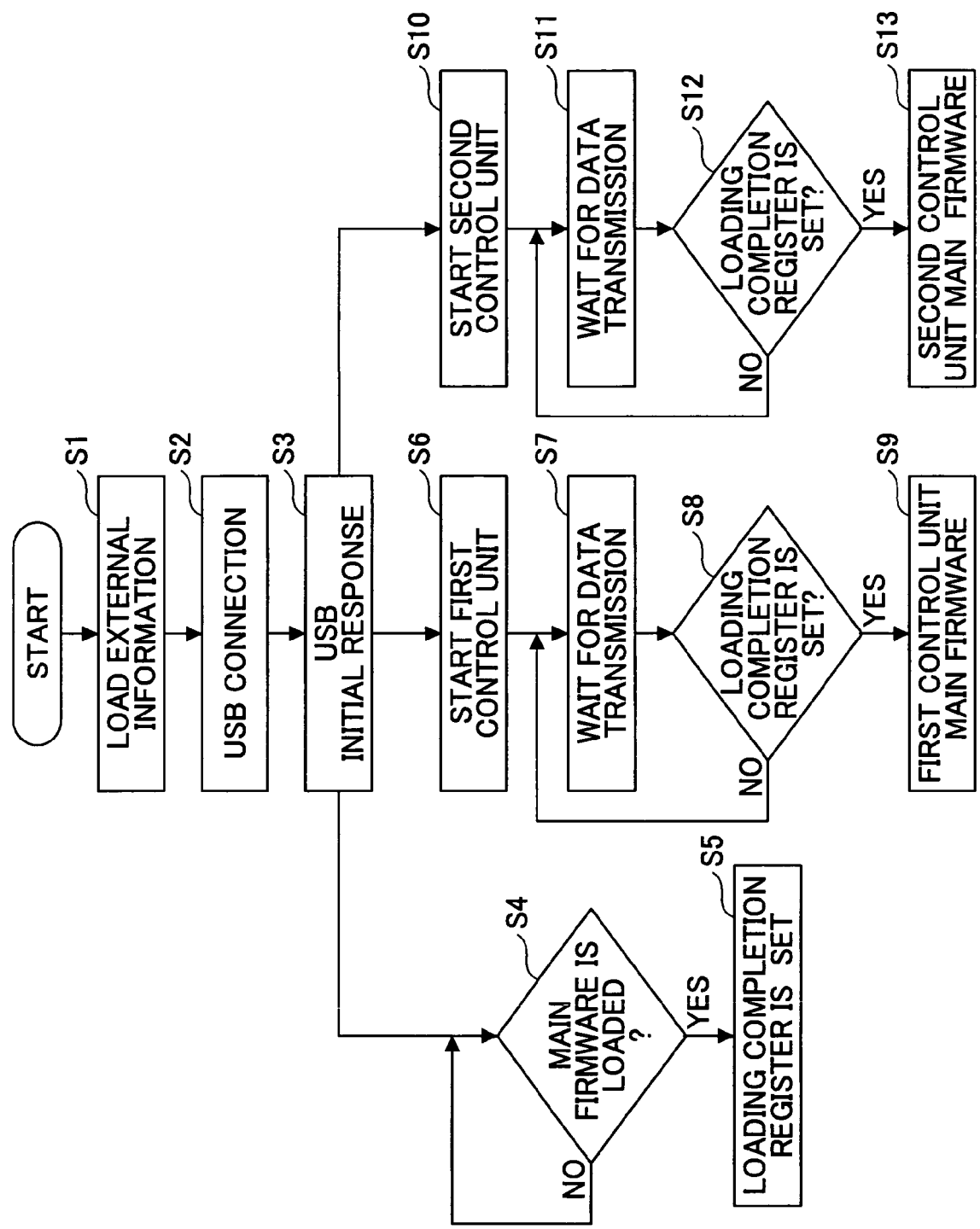
FIG. 5 is a flowchart illustrating an exemplary process performed by a USB control device of FIG. 1.

FIG. 5 is a flowchart illustrating an exemplary process, which is performed by the USB control device 1 of FIG. 1 every time the USB control device 1 of FIG. 1 is connected to the host computer HC.

The operations shown in the flowchart of FIG. 5 are performed by the CPU 14, which executes the loader program stored in the ROM 17, except for the operations in step S9 and step S13. In step S1, when the host computer HC is connected to the USB control unit 11 via the USB 7, the CPU 14 executes the loader program stored in the ROM 17 so as to read out information necessary for generating initial configuration information, such as configurations and types of the present external devices, from the external memory unit 18.

Then, in step S2, the CPU 14 reports to the host computer HC via the USB control unit 11 and the USB 7 that external devices are connected. When the host computer HC recognizes the connection of the external device, the host computer HC performs a USB configuration process in order to identify the external devices. Then in step S3, in response to a request for USB configuration information received from the host computer HC, the CPU 14 returns a USB initial response based on information about the configurations of the present external devices and the like obtained from the external memory unit 18.

Figure 6:
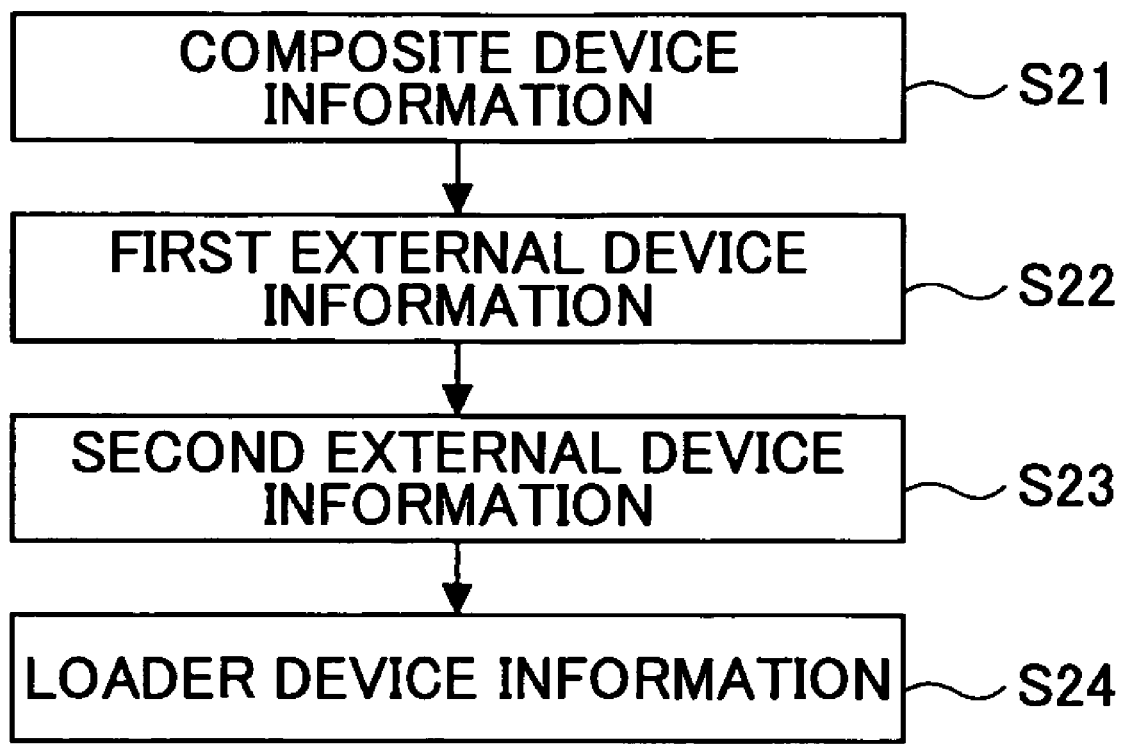
FIG. 6 shows an example of a USB initial response from the USB control device of FIG. 1.
Figure 7:
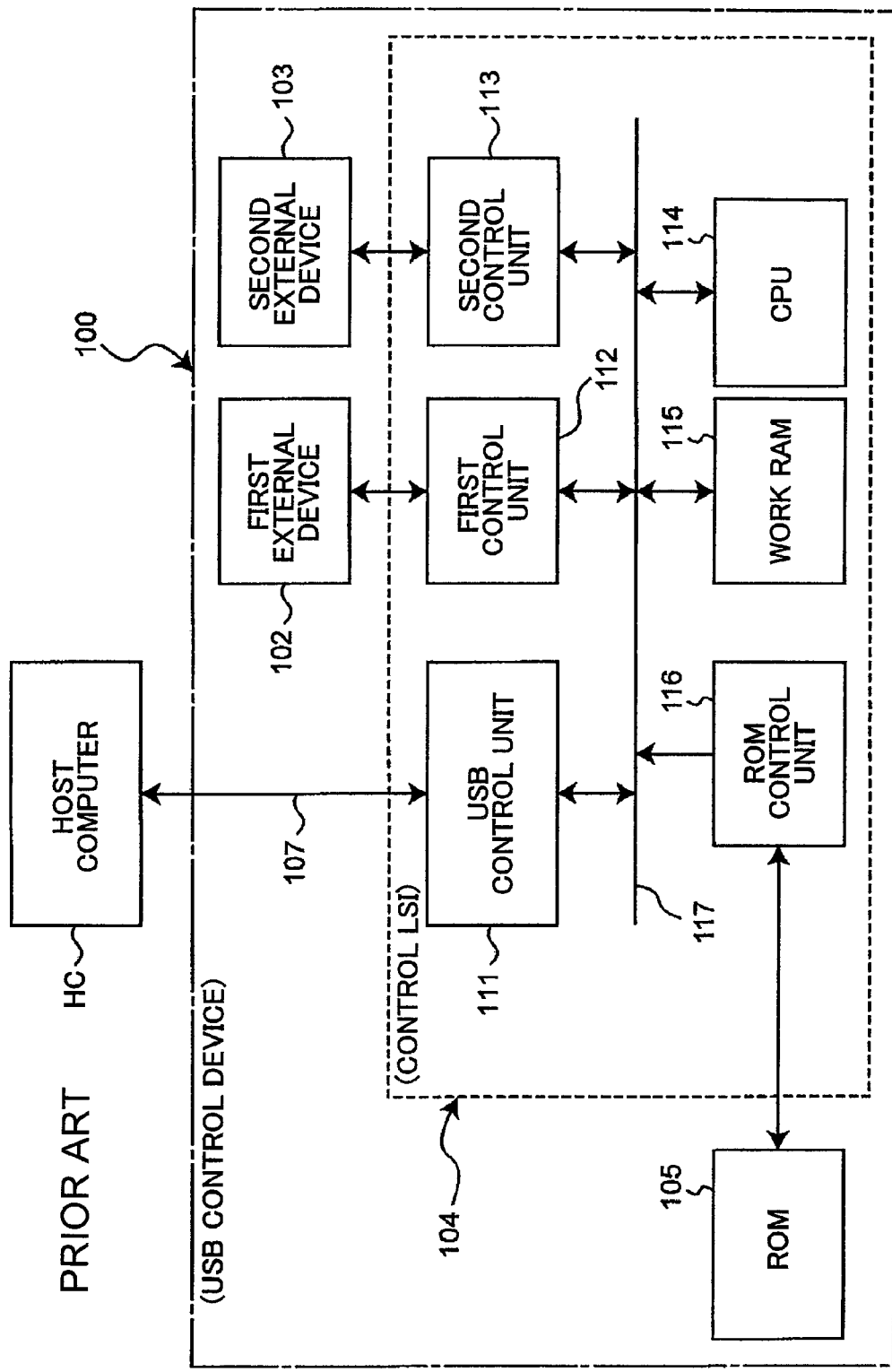
FIG. 7 is a block diagram illustrating a related-art USB control device.

FIG. 6 shows an example of the USB initial response from the USB control device 1. With reference to FIG. 6, the CPU 14 returns a configuration response to the host computer HC, including composite device information showing the presence of a composite device, first external device information indicating that the first external device 2 is connected, second external device information indicating that the second external device 3 is connected, and loader device information indicating that a loader function for downloading the firmware is provided in the program RAM 16. Then, the host computer HC reads and executes driver software for each of the first external device 2, the second external device 3, and the loader device. Then, main firmware to be downloaded into the control LSI 4 is transmitted from the driver software for the loader device to the control LSI 4 via the USB 7.

Referring again to FIG. 5, in step S4, the CPU 14 loads main firmware information transmitted from the host computer HC, i.e., a loader driver, into the program RAM 16, and determines whether the loading is completed. For example, the CPU 14 determines that the loading is completed when the data of the volume specified in information indicating how many bytes of data are to be loaded as the main firmware have been loaded. Then, the CPU 14 sets a loading completion register (not shown) when the loading of the main firmware is completed.

After step S3, the CPU 14 also executes the loader program for the first control unit 12 in step S6 and the loader program for the second control unit 13 in step S10 at the same time. In some cases, the host computer HC sends a data transmission request to the USB control device 1 via the USB 7 when the host computer HC performs the USB configuration process and executes the driver software for the first and second external devices 2 and 3. If the request is sent, the CPU 14 makes the host computer HC wait for a response in step S7 and step S11. Specifically, because the first and second external devices 2 and 3 cannot be successfully operated until the loading of the main firmware is completed, the CPU 14 returns a NAK packet indicating that the data transmission is not ready in response to the data transmission request sent from the host computer HC so as to make the host computer HC wait for the data transmission.

Then, the firmware stored in the loader programs for the first control unit 12 and the second control unit 13 determines whether the corresponding loading completion registers are set in step S8 and step S12. If the loading completion register is set (Yes), the firmware determines that the main firmware for controlling the corresponding external device 2, 3 is loaded in the program RAM 16, and executes the firmware for the corresponding control unit 12, 13 of the program RAM 16 in step S9 and step S13. After that, USB operations are successfully performed when the driver software for controlling the first and second external devices 2 and 3 executed by the host computer HC sends the data transmission request.

While the external setting unit 5 outputs 3-bit data in the above embodiment, the external setting unit 5 may output 1-bit data or multiple-bit data depending on an external device to be connected.

Since the USB control device 1 as the control program download device of the first embodiment downloads the firmware from the host computer HC to the program RAM 16 of the control LSI 4, there is no need to have an external ROM for storing the firmware. Accordingly, overall system cost and size are reduced due to the elimination of the need for the external ROM. Since the firmware can be downloaded without reconnection of the USB or the like, content of the firmware can be easily altered, thereby increasing the versatility of the control LSI 4.

The present application is based on Japanese Priority Application No. 2005-002152 filed on Jan. 7, 2005, with the Japanese Patent Office, the entire contents of which are hereby incorporated by reference.

What is claimed is:
1. A control program download device to be connected to a host computer so as to download a control program to a rewritable internal memory circuit, comprising:
   an external setting unit in which external information indicating an external device and a software loader device is preset;
   an external memory unit into which the external information is loaded from the external setting unit in response to a control signal input to the external memory unit; and a download control unit that includes the software loader device and that controls download of the control program to the rewritable internal memory circuit;

wherein to download the control program, the download control unit loads the external information from the external setting unit into the external memory unit, reads the external information from the external memory unit to send the read external information to the host computer in response to a request for configuration information from the host computer, and downloads the control program from the host computer to the rewritable internal memory unit, and wherein the control program is a program for controlling the external device, wherein the external information sent to the host computer causes the host computer to execute driver software corresponding to the external device and driver software, corresponding to the software loader device, which transmits the control program to the control program download device, and wherein the download control unit checks whether download of the control program is completed while downloading the control program, and, if the download control unit receives a data transmission request from the host computer before download of the control program for controlling the external device is completed, the download control unit causes the host computer to wait for the data transmission.

2. The control program download device as claimed in claim 1, further comprising: an external device control unit that controls operations of the external device according to the control program downloaded in the rewritable internal memory circuit.

3. The control program download device as claimed in claim 2, wherein the download control unit reports to the external device control unit that the download of the control program is completed when the download of the control program to the rewritable internal memory circuit is completed; and after receiving the report, the external device control unit controls the operations of the external device according to the control program downloaded in the rewritable internal memory circuit in response to access from the host computer.

4. The control program download device as claimed in claim 1, wherein when the host computer requests the external device to transmit data before the download of the control program is completed, the download control unit sends a response to the host computer indicating that the data is not ready.

5. The control program download device as claimed in claim 1, wherein the download control unit sends a report to the host computer, together with the external information, indicating that a loader function for downloading the control program is provided in response to the request for the configuration information from the host computer.

6. The control program download device as claimed in claim 1, wherein the external setting unit comprises a pull-up resistor and/or a pull-down resistor such that digital data representing the external information are preset with use of the pull-up resistor and/or the pull-down resistor.

7. The control program download device as claimed in claim 1, wherein the external setting unit comprises a nonvolatile memory, in which digital data representing the external information are preset.

8. The control program download device as claimed in claim 1, wherein the external setting unit comprises a nonvolatile memory, in which digital data items representing composite device information that shows the presence of a composite device and information that indicates whether a loader function for downloading the control program is provided are preset together with the external information.

9. The control program download device as claimed in claim 1, wherein the download control unit is connected to the host computer via a universal serial bus.

10. The control program download device as claimed in claim 1, wherein, if the download control unit receives a data transmission request from the host computer before download of the control program is completed, the download control unit causes the host computer to wait for the data transmission by returning a NAK packet to the host computer.

* * * * *